United States Patent [19]

Trenkamp

[11] 4,029,944
[45] June 14, 1977

[54] DATA TRANSDUCER

[75] Inventor: Robert H. Trenkamp, Cleveland Heights, Ohio

[73] Assignee: Addressograph Multigraph Corporation, Cleveland, Ohio

[22] Filed: Apr. 7, 1976

[21] Appl. No.: 674,562

[52] U.S. Cl. ................ 235/61.11 D; 235/61.11 E; 240/146.3 D; 360/110
[51] Int. Cl.² .................... G06K 7/08; G06K 7/10; G06K 9/00; G11R 5/12
[58] Field of Search ............ 235/61.11 E, 61.11 D, 235/61.11 R; 340/146.3 D; 360/2, 110; 250/566, 569

[56] References Cited

UNITED STATES PATENTS

| | | | |
|---|---|---|---|
| 3,612,835 | 10/1971 | Andrews et al. | 235/61.11 D. |
| 3,764,978 | 10/1973 | Tyburski et al. | 235/61.11 R |

*Primary Examiner*—Daryl W. Cook
*Attorney, Agent, or Firm*—Harry M. Fleck, Jr.

[57] ABSTRACT

An optical and magnetic data transducer is provided comprising a magnetic reluctance aperture which is split into two sections with an optical reading aperture disposed generally therebetween. This reduces timing errors between the optical and magnetic output signals indicative of the spacial relation of the optical and magnetic data element boundaries, such errors being due to variations in temperature and skewing.

13 Claims, 11 Drawing Figures

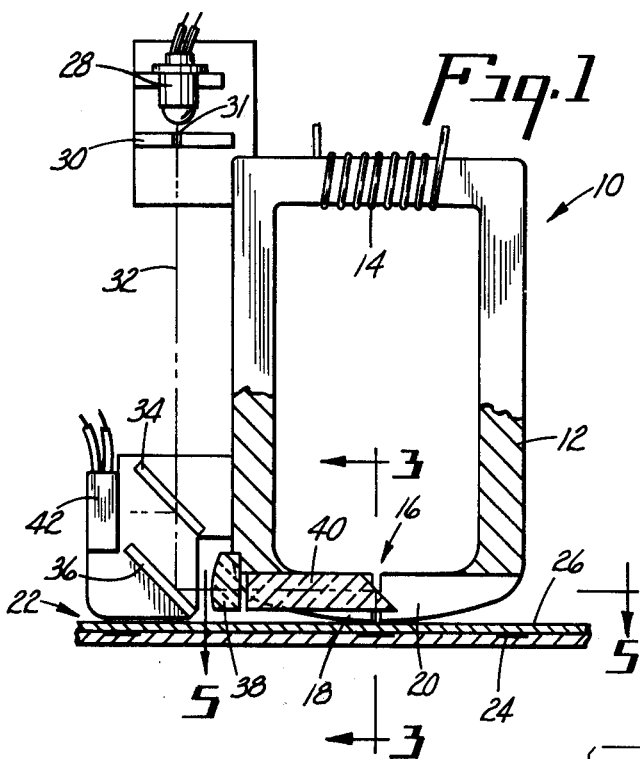
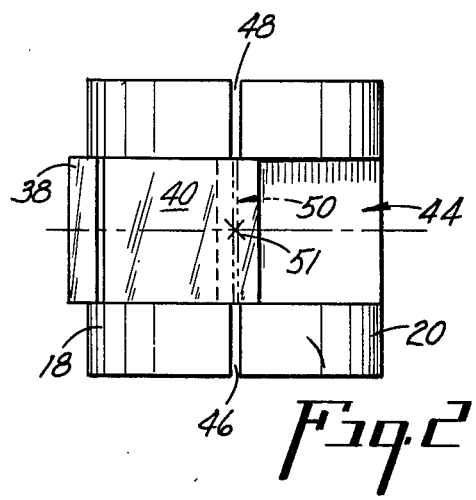
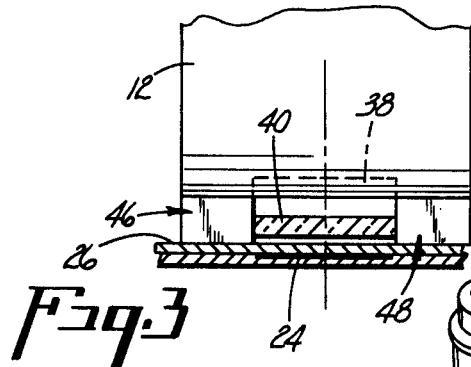
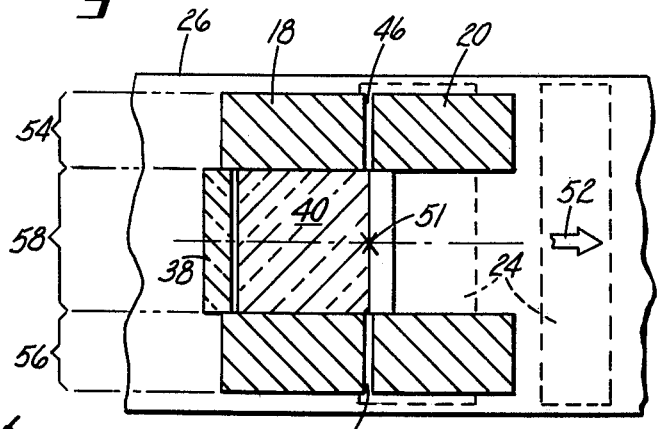
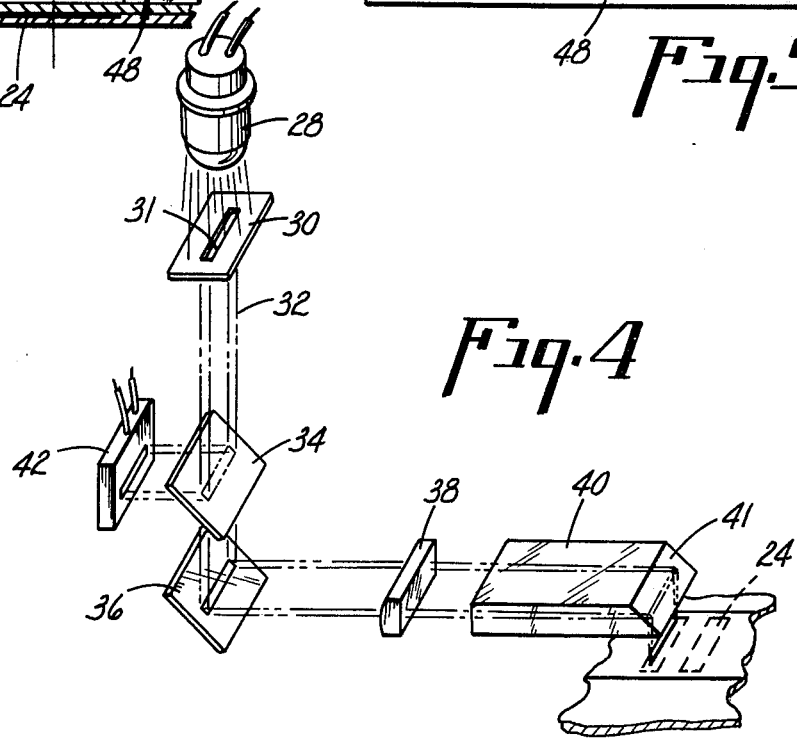

DATA TRANSDUCER

BACKGROUND OF THE INVENTION

The present invention is generally related to magnetic read heads and, more particularly, to a versatile reader for sensing both magnetic and optical data from a credit card or other data carrying member.

Credit card alteration, duplication and counterfeiting have become increasingly large problems in recent years. Proposals have been made to provide credit card structures with secure properties or features. One such security feature is disclosed in copending U.S. Pat. application Ser. No. 581,428, entitled SECURE PROPERTY DOCUMENT AND METHOD OF MANUFACTURE, in the name of Charles K. Beck et al. and assigned to the assignee of the present invention. Briefly, this security feature entails the use of infrared reflectors which are deposited beneath the magnetic media to define optical data elements which are sensed by an IR detector. This optical data may be related in some way to magnetic data recorded on one of the magnetic stripe data tracks, such as disclosed in copending U.S. patent application Ser. No. 581,351, entitled SECURE PROPERTY DOCUMENT AND SYSTEM, filed in the name of Francis C. Foote and assigned to the assignee of the present invention. The application discloses a reading arrangement entailing the use of an optical IR detector and a magnet read head mounted in a predetermined spacial relationship. The spacing between the optical detector and magnetic read head may be set at the factory to provide proper timing between the magnetic and optical data sets. The timing may also be adjusted electronically through the use of appropriate circuitry. It has been found that temperature changes may alter the spacing between the magnetic read head and optical detector, thereby adversely affecting the relative timing between the magnetic and optical data. This timing may also be adversely affected by thermal expansion or contraction of the credit card due to changes in ambient temperatures.

These various timing problems may be cured to some extent by mounting the magnetic read head immediately beside the optical detector. This, however, is often inappropriate due to the limited width of the magnetic stripe and the fact that the optical data area is located directly beneath the magnetic stripe. It is also important to note that significant timing errors between the optical and magnetic data may be caused due to skewing of the card or data elements relative to the read head.

These problems are resolved through the use of a composite read head of the type disclosed in copending U.S. Pat. application Ser. No. 581,423, entitled COMPOSITE MAGNETIC/OPTICAL READER AND METHOD, now abandoned. That application was filed in the name of Robert A. Rubenstein and is assigned to the assignee of the present invention. The application discloses a composite reader for sensing magnetic data at the same point in time as the underlying optical data element. This is achieved by directing infrared radiation through the reluctance aperture of the magnetic read head. If a reflector is present in the area directly beneath the aperture, the IR radiation is reflected back through the aperture to appropriate IR detector.

Improved reading and recording accuracy may be achieved by providing a relatively narrow reluctance gap in the range of 1-2 mils. It has been found, however, that in many applications it is difficult to successfully direct a beam of IR radiation through such a narrow gap due to several optical limitations, such as the refractive index and configuration of the solid material molded into the gap.

SUMMARY OF THE INVENTION

The present invention overcomes the above-described optical problem and at the same time allows reading of the magnetic and optical data through apertures lying approximately in the same plane. In determining the spacial relationship between the optical and magnetic data elements, lack of parallellism between the reading apertures of the transducer and the boundaries or edges of the optical and magnetic data elements would result in significant timing or phase errors. This condition is commonly referred to as "head skew". The present invention substantially eliminates timing errors caused by "head skew" by splitting the magnetic reluctance aperture into two sections and providing an optical path which passes through one of the pole pieces to an optical aperture disposed between the reluctance apertures.

In the preferred embodiment of the present invention, this is achieved by directing the radiation through an appropriate prism mounted in a groove formed in the face of the magnetic read head and extending perpendicular to the magnetic reluctance apertures. This configuration also allows intentional timing offsets by spacing the optical reading aperture slightly from the plane of the magnetic reluctance apertures.

It is an object of the present invention to provide a versatile magnetic and optical transducer which substantially eliminates timing errors between the optical and magnetic data due to variations in temperature and skewing.

Another object of the present invention is to provide a novel transducer which has relatively narrow magnetic reluctance apertures for accurately sensing magnetic data, yet without need for expensive optics or the like to direct a very narrow beam of radiation through the aperture.

It is a further object of the present invention to provide a unique composite magnetic and optical transducer having two magnetic reluctance apertures disposed on opposite sides of the optical reading aperture, whereby each output signal is the composite result of the magnetic flux changes sensed at both apertures, such that timing errors between the optical and magnetic data due to skewing are substantially eliminated.

Still another object of the present invention is to provide a versatile composite optical and magnetic read head with the optical reading aperture which may be intentionally offset slightly from the magnetic reading apertures to affect the phase relationship between the resultant optical and magnetic data signals.

BRIEF DESCRIPTION OF THE DRAWINGS

FIG. 1 is a side elevation of a transducer of the present invention with sections removed.

FIG. 2 is a partial bottom plan view of the transducer shown in FIG. 1.

FIG. 3 is a sectional view taken along sections 3—3 of FIG. 1.

FIG. 4 is an enlarged, exploded perspective view of the optical system associated with the transducer of the present invention.

FIG. 5 is a sectional view taken along section 5—5 of FIG. 1.

DETAILED DESCRIPTION OF THE PREFERRED EMBODIMENT

Figure 6:
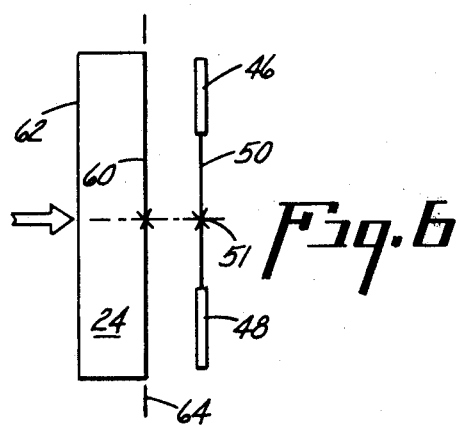
FIG. 6 is a diagrammatic illustration of the geometry of optical and magnetic reading apertures and an optical reflector when the transducer and data bearing member are in proper alignment.

Referring now, more particularly, to FIGS. 1–3 of the drawings, the data transducer of the present invention is generally indicated by the numeral 10 and includes a core 12 of magnetic material, such as ferrite or other well known commercially available materials used for magnetic read heads. The core is provided with a central opening and an appropriate output winding 14 which provides electrical output signals indicative of the magnetic data being read. A gap 16 is formed between a pair of oppositely disposed magnetic pole pieces 18 and 20 of core 12. Preferably, the bottom surfaces of the pole pieces are of curved configuration and are adapted to be brought into operative sliding engagement with a card 22 or other data bearing member containing both optical and magnetic data elements.

The data bearing member 22 contains a plurality of reflective elements 24 which underlie (or overlie) a magnetic stripe 26. These elements define optical data which may be utilized for various purposes, such as determining the authenticity of the presented card or document. A detailed description of such a card structure and associated system for processing the data are disclosed in the above U.S. Pat. applications Ser. Nos. 581,428 and 581,351 which are incorporated herein by reference.

The transducer of the present invention is provided with a source 28 of infrared (IR) or other appropriate radiant energy. Source 28 is mounted, by suitable means, adjacent an optical slit member 30 which provides a beam of radiation along a path 32 to a beam splitter 34. The transmitted beam of IR radiation is reflected by an appropriate mirror 36 through a lens 38 and a prism 40 to the data bearing member to be read. The effective image of the slit member 30 projected onto the data bearing member comprises the optical reading aperture. The presence of a reflector 24 will result in the reflection of a significant amount of radiation back along the optical path to an IR detector 42, which provides a corresponding electrical output signal. This signal is processed by appropriate circuitry (such as disclosed in the above-referenced application Ser. No. 581,351) to indicate the presence of an optical element or edge associated therewith.

Referring to FIG. 4, the arrangement of the optical system associated with the present invention may be more fully understood. In the preferred embodiment, the member 30 contains a slit 31 which is of generally rectangular configuration and is approximately 6 mils × 30 mils. This provides a generally columnar beam of radiation, 32, a portion of which passes through a conventional beam splitter 34 and is reflected off of mirror 36. Preferably, lens 38 is of the cylinder type for focussing or concentrating the beam at an image plane located at or near the optical data elements 24. The beam of IR radiation is reflected in a downward direction by reflective surface 41 associated with prism 40. The area which the beam occupies directly beneath the prism is referred to herein as the optical reading aperture, since the presence of a reflector at or directly beneath the aperture will result in reflection of a significant amount of radiant energy back through the optical system to IR detector 42. The focussing affect of lens 38 and prism 40 results in a very narrow beam of radiation (approximately 1 mil × 30 mils) which intersects the optical data elements. Thus, the leading and trailing edges or boundaries of the reflectors may be detected with a high degree of accuracy.

Referring back to FIGS. 2 and 3, it will be appreciated that prism 40 is mounted in a groove or opening 44 formed in the magnetic transducer surface which normally makes contact with the data bearing member. This provides an optical path which extends through pole piece 18 to the optical reading aperture. The absence of magnetic material in the area of groove 44, in effect, results in a pair of magnetic reluctance apertures 46 and 48 disposed on opposite sides of the optical reading aperture, generally indicated by the dashed lines 50 in FIG. 2. The center 51 of the optical reading aperture is located midway between the reluctance apertures. It should be noted, that in actual practice it may be desirable to encapsulate or seal the prism within the groove with an appropriate material which is transparent to the radiation. This is also true for the gaps between the magnetic reluctance apertures; glass materials being a common filler.

Magnetic data is sensed through changes in magnetic flux occurring at both gaps of 46 and 48. Technically speaking, the magnetic flux changes appear just outside of the gaps. But for the purposes of this description, they may be considered to be at the reluctance apertures. The resultant magnetic flux changes are passed through core 12 to output winding 14. Thus, the output signals are the result of the combined effects of magnetic flux changes sensed at both reluctance apertures 46 and 48, as hereinafter explained.

Referring now to FIG. 5, the operation of the transducer of the present invention may be more fully understood. In FIG. 5, the transducer is illustrated in operative engagement with an elongated magnetic stripe 26 associated with a data bearing member. For the purposes of this description, the magnetic stripe may be considered as a single magnetic data track, as opposed to two and three track stripes which are now common in the credit card field. The operation of the present invention as herein described is the same for two or three track systems, the only difference being that additional magnetic read heads are required for the second and third tracks. Furthermore, the present invention is applicable to magnetic data other than magnetic stripes, as for example, magnetic discs for data storage.

As the data bearing member is moved relative to the transducer in a direction indicated by arrow 52, reluctance aperture 46 senses the magnetic data elements (flux changes) along the first longitudinal path or area 54. The same magnetic data elements, but a different portion thereof, are sensed by magnetic reluctance aperture 48 along a second longitudinal path or area 56. At the same time, as the magnetic data elements are being sensed, the underlying optical data elements are sensed through the optical reading aperture along a third longitudinal path or area 58 located between paths 54 and 56. During the reading process, the magnetic flux changes sensed at apertures 46 and 48 are combined in the magnetic core 12 to provide a resultant output signal through winding 14. Of course, it is not intended that the present invention be limited to the use of a single output winding, it being well known to use multiple windings with magnetic read heads for various purposes, such as eliminating signals due to stray magnetic fields.

As mentioned above, one of the objects of the present invention is to substantially reduce the timing or phase errors between the optical and magnetic data signals due to skewing between the transducer and data of the data bearing member. Such skewing is commonly caused be misalignment of the read head, misregistration of the card during reading, improperly aligned magnetic stripes, or improper cutting of the credit cards during manufacture. The adverse effect is substantially the same for each of these cases, that being that the axis of the reading apertures is at an improper angle to the edges or boundaries of magnetic or optical data elements. It should be recognized, of course, that many magnetic recording techniques and standards call for intentional angular placement of the magnetic flux reversals. For the purpose of this description, however, it will be assumed that when there is no skewing the magnetic flux reversals are perpendicular to the path of travel and parallel to the axis of the magnetic reluctance apertures. It is further assumed that a non-parallel condition is representative of one of the skew conditions described above. These assumptions will apply as well for the optical reflector edges.

Figure 6A:
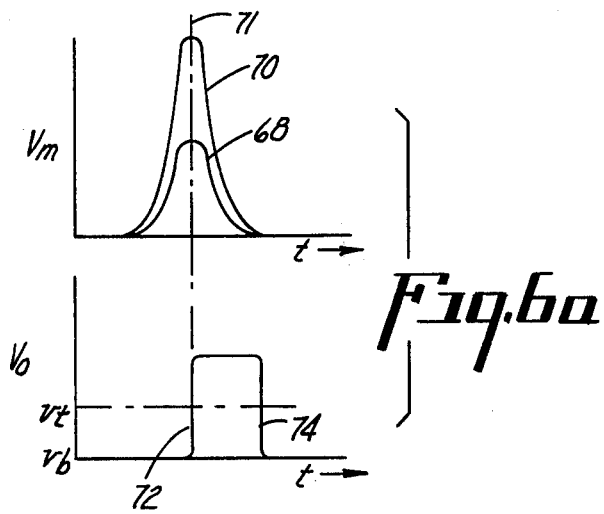
FIG. 6a is a simplified illustration of the resultant optical and magnetic signals obtained with the aligned condition illustrated in FIG. 6.

Referring to FIGS. 6 and 6a, the operation of the transducer of the present invention when proper alignment exists (no skewing) may be appreciated. The magnetic reluctance apertures 46 and 48 are illustrated as small rectangular areas, with the optical reading aperture being indicated by line 50 extending between the reluctance apertures. An optical reflector 24 is illustrated with leading and trailing edges 60 and 62, respectively, paralleling the optical read aperture 50. In addition, a magnetic flux reversal 64 is illustrated as being coincident with leading edge 60 of the optical reflector. As this magnetic flux reversal passes under apertures 46 and 48, a pair of coincident current or voltage signals 68 result at the output winding, as shown by the curve of $V_m$ vs. $t$. The additive or composite result of signals 68 is indicated by curve 70, with the center line thereof being indicated by numeral 71. The output of detector 42 is illustrated in simplified form by the curve of $V_o$ vs. $t$. The passage of leading edge 60 under the optical reading aperture results in sharp increase from a background level $v_b$ through a threshold level $v_t$ to a maximum. This increase is indicated at 72 and may be considered to rise on line 71. Trailing edge 62 of the optical reflector causes a decrease in the corresponding optical signal, as indicated at 74. For the purposes of this explanation, the optical and magnetic signals are considered to be in phase. It should be noted that these signal patterns are not necessarily to scale and are shown in a very simplified form for the purposes of explanation.

Figure 7:
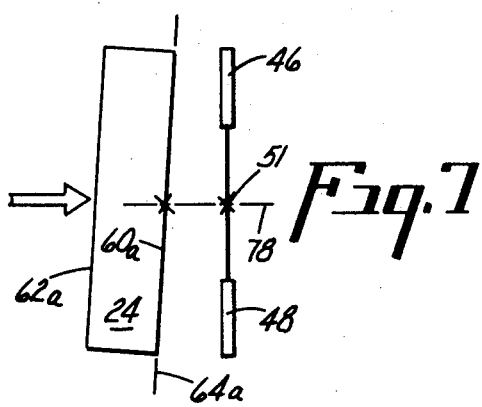
FIG. 7 is a diagrammatic illustration of the optical and magnetic reading apertures and an optical reflector when the transducer is skewed relative to the data bearing member.
Figure 7A:
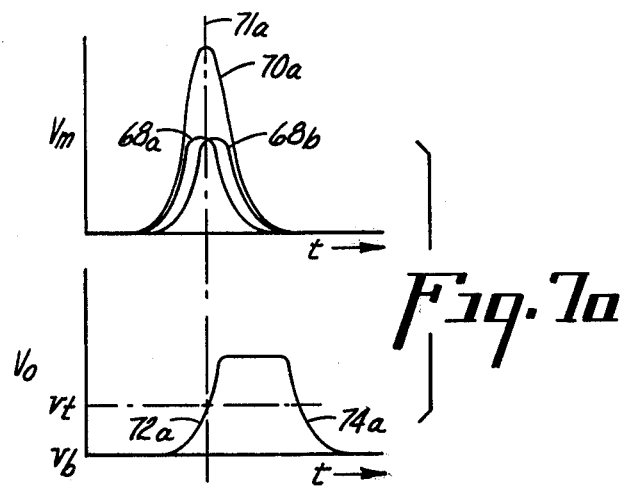
FIG. 7a is a simplified illustration of the resultant optical and magnetic data signals obtained with the skew condition illustrated in FIG. 7.

With reference to FIGS. 7 and 7a, operation of the transducer of the present invention under a skew condition will be more fully appreciated. In FIG. 7, the leading and trailing edges 60a and 62a of reflector 24, as well as magnetic flux reversal 64a are at an angle (non-parallel) to the axis of the optical and magnetic reading apertures. This results in flux reversal 64a appearing under aperture 46 slightly before it arrives under aperture 48. Flux changes within aperture 46 result in a signal component illustrated by curve 68a. A second signal component 68b is generated as a result of flux changes sensed at magnetic reluctance aperture 48. The combined effect of those two components is illustrated as curve 70a having a center line 71a.

Similarly, the upper portion of leading edge 60a will arrive at the optical reading aperture slightly before the lower portion of the same edge. Only a portion of the radiant energy will be reflected initially, causing a slope in the optical signal as indicated by 72a. The signal corresponding to the trailing edge will also be sloped as indicated by 74a. By setting a threshold level $v_t$ at approximately half way between the background voltage level $v_d$ and the maximum by an appropriate threshold circuit, the rising edge 72a crosses center line 71a at the threshold value $v_t$, or very close thereto. When the threshold voltage $v_t$ is reached, the circuitry in effect recognizes the presence of a leading edge and such is in phase with the recognition of a coincident flux reversal. The center of the optical reading aperture is indicated by numeral 51 and lies in a plane into the paper in FIG. 7 and indicated by a line passing through aperture 51. This plane is substantially perpendicular to the contact surface and midway between the reluctance apertures 46 and 48.

Figure 8:
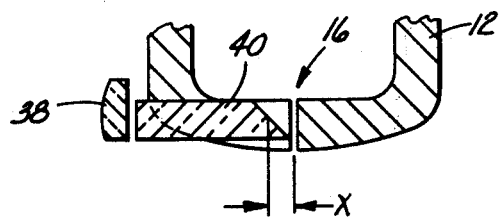
FIG. 8 is a partial sectional view of a modified embodiment of the present invention.
Figure 8A:
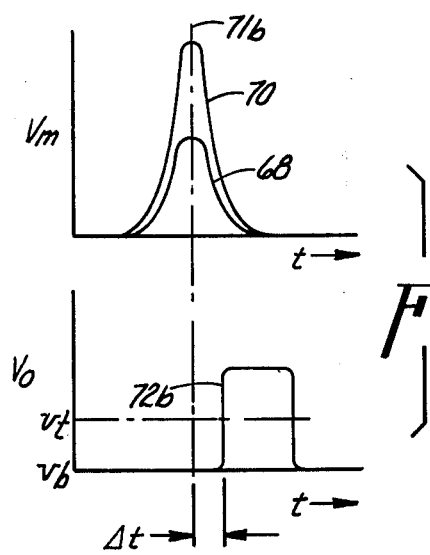
FIG. 8a is a simplified illustration of the resultant optical and magnetic signals obtained from the embodiment illustrated in FIG. 8 under an aligned condition.

FIG. 8 illustrates a modified form of the present invention wherein the optical reading aperture is intentionally offset slightly from the magnetic reading aperture by a predetermined dimension $x$. This is achieved by repositioning prism 40 within mounting groove 44. Such intentional offsetting between the optical and magnetic aperture may be desirable for security purposes. For example, the offset dimension may be varied intentionally from terminal to terminal within a system, thereby changing the phase relationship between the resultant optical and magnetic data signal from terminal to terminal. This is illustrated in FIG. 8a by curves $V_m$ vs. $t$, and $V_o$ vs. $t$, wherein rising edge 72b is offset from center line 71b by the time equivalent $\Delta t$ of dimension $x$. It will be appreciated, however, that even when offsetting the apertures, errors due to skewing will still be minimized in the manner described above. This is true so long as the center of the optical aperture lies in a plane passing through the center of gap axis and perpendicular thereto.

From the foregoing description, it will be appreciated that the transducer of the present invention provides a means for simultaneously sensing magnetic and optical data elements while maintaining the phase relation (and thus the spacial relation) therebetween. The present invention in its modified form also permits intentional offsetting or phase shifts between the resultant optical and magnetic data signals. Both forms of the invention eliminate or significantly reduce timing errors due to skewing between the transducer and the data element boundaries.

It should be noted that the present invention may be utilized for recording as well as reading magnetic data. Also, it is not essential that the transducer include a radiation source, as the radiant energy ultimately detected may be generated from various sources, or even from the optical data members themselves or background serving black body radiators. It is not intended that the present invention be limited to the geometry illustrated in the drawings. It is foreseeable that various arrangements may be utilized to provide an optical path extending to an optical reading aperture disposed between a pair of magnetic reluctance apertures described herein. Furthermore, various types and configurations of magnetic cores and pole pieces may foreseeably be utilized by those skilled in the art.

While the invention has been particularly shown and described with reference to the preferred embodiments thereof, it will be understood by those skilled in the art that the foregoing and other changes in the form and details may be made within the spirit and meaning of the invention.

What is claimed:

1. A data transducer for use with a data bearing member comprising:
   a magnetic transducer having a core with a pair of spaced, oppositely disposed magnetic pole pieces, a narrow gap between said pole pieces, said gap defining a pair of spaced magnetic reluctance apertures, and an optical reading aperture disposed between said spaced magnetic reluctance apertures,
   optical means including means for directing radiant energy along an optical path which extends through at least one of said pole pieces and through said optical reading aperture, and
   radiant energy sensing means for providing signals in response to exposure to said radiant energy under predetermined conditions.

2. The structure set forth in claim 1 wherein said optical reading aperture is located midway between said magnetic reluctance apertures whereby timing variations between the optical and magnetic data read due to undesired skewing of the transducer to the data bearing member are reduced.

3. The structure set forth in claim 2 wherein said transducer includes a source of radiant energy, said optical means including means for directing said radiant energy from said source along said optical path and concentrating said radiant energy at an image plane coincident with the location of a data bearing member being read.

4. The structure set forth in claim 3 wherein said optical means includes means for directing radiant energy reflected from a data bearing member to said radiant energy sensing means.

5. A transducer for reading data along a path of travel on a data bearing member, said transducer comprising:
   a read head having a core of magnetic material with a contact surface adapted to engage the data bearing member during reading, a pair of spaced, oppositely disposed pole pieces with a gap therebetween cutting across said surface between first and second points and transversely of said path of travel,
   a source of radiant energy,
   optical means for directing said radiant energy from said source along an optical path passing through at least one of said pole pieces to an optical reading aperture having a center lying in a plane located midway between said first and second points and generally perpendicular to said contact surface, and
   radiant energy sensing means for providing signals in response to exposure to said radiant energy under predetermined conditions.

6. The structure set forth in claim 5 wherein said read head includes a groove devoid of magnetic material, said groove being formed in said contact surface, said optical path passing through said groove to said optical reading aperture.

7. The structure set forth in claim 6 wherein said gap defines a pair of spaced magnetic reluctance apertures with said groove passing therebetween.

8. The structure set forth in claim 7 wherein the center of said optical reading aperture is approximately located in a plane which extends between said first and second points and which is disposed between said pole pieces.

9. The structure set forth in claim 7 wherein the center of said optical reading aperture is spaced a predetermined distance from a plane which extends between said first and second points and which is disposed between said pole pieces.

10. A method of simultaneously reading optical and magnetic data elements from a common area on a date member with a magnetic read head having a pair of magnetic pole pieces and a gap therebetween, said method comprising the steps of:
    bringing said read head gap into operative reading relation with said data member,
    providing radiant energy along a path which intersects said data member and which passes through at least one of said pole pieces to an optical reading aperture in said gap,
    sensing said radiant energy which intersects optical data elements adjacent said gap on said data member to provide corresponding first signals, and
    sensing magnetic field changes adjacent an area of said gap separate from said first optical reading aperture to provide second signals indicative of a magnetic data element adjacent said gap.

11. The method set forth in claim 10 wherein said gap area where said magnetic field changes are sensed is defined by a pair of magnetic reluctance apertures located on opposite sides of said optical reading aperture.

12. The method set forth in claim 10 wherein the effective reading areas of said magnetic reluctance apertures are approximately equal.

13. A method of sensing optical and magnetic data from a data bearing member containing a magnetic data track and optically sensible data elements in superimposed relation with said track, said method comprising:
    bringing the data bearing member into operative engagement with a magnetic transducer, and effecting relative movement therebetween while:
    sensing magnetic data elements along first and second spaced paths over said track and providing output signals indicative of magnetic data elements, and
    sensing the optical data elements along a third path between said first and second paths and providing optical output signals indicative thereof.

* * * * *